United States Patent [19]

Lee

[11] Patent Number: 5,372,377
[45] Date of Patent: Dec. 13, 1994

[54] STEERABLE FRONT WHEEL SUSPENSION FOR VEHICLE

[75] Inventor: Unkoo Lee, Anyang, Rep. of Korea

[73] Assignee: Hyundai Motor Company, Seoul, Rep. of Korea

[21] Appl. No.: 162,947

[22] Filed: Dec. 8, 1993

[30] Foreign Application Priority Data

Dec. 28, 1992 [KR] Rep. of Korea .................. 9225849

[51] Int. Cl.$^5$ ............................................ B60G 3/00
[52] U.S. Cl. ................................. 280/691; 280/675; 280/660
[58] Field of Search ............ 280/673, 675, 690, 691, 280/688, 660, 696, 670

[56] References Cited

U.S. PATENT DOCUMENTS

5,048,860  9/1991  Kanai et al. ............... 280/675 X
5,257,801  11/1993  Matsuzawa et al. ............... 280/691

FOREIGN PATENT DOCUMENTS

2241811  9/1990  Japan .................. 280/675
3193513  8/1991  Japan .................. 280/675

*Primary Examiner*—Karin L. Tyson
*Assistant Examiner*—Christopher P. Ellis
*Attorney, Agent, or Firm*—Birch, Stewart, Kolasch & Birch

[57] ABSTRACT

A steerable front wheel suspension for a vehicle includes a steering knuckle, a lower control arm for connecting the steering knuckle to a vehicle body, an upper control arm, a center control arm, and a connecting arm. The arms are disposed such that an intersecting point of an imaginary line extending from the lower control arm and an imaginary line connecting an intersecting point of a line extending from the upper control arm and a line extending from the center control arm to an instantaneous center of the wheel with respect to the connecting arm becomes an instantaneous center of the wheel with respect to the car body.

6 Claims, 5 Drawing Sheets

STEERABLE FRONT WHEEL SUSPENSION FOR VEHICLE

BACKGROUND OF THE INVENTION

1. Field of the Invention

The present invention relates to a steerable front wheel suspension for a vehicle and, more particularly, to a front wheel suspension for a vehicle which can increase a free layout degree with respect to variation of a camber and caster, and improve handling safety by providing a nominal kingpin and decreasing variation of a height of roll-center by means of a nominal link, and then maximize the effective volume of an engine room by minimizing the space occupied by the suspension.

2. Description of Related Art

A conventional suspension for a vehicle connects an axle shaft and a car body to each other, and controls a position of a tire with respect to the car body for its optimal position during running of the vehicle. Thus, optimal handling safety may be obtained, and, the axle shaft is prevented from directly transmitting impact or vibration from a road surface to the car body, thereby preventing damage of baggage and improving riding comfort.

Particularly, in a steerable front wheel suspension, the suspension should be designed to absorb vibration or impact from the road surface as well as obtain running safety by maintaining an optimal position of a vehicle's straight ahead position and handling safety of a vehicle's turning point.

The front wheel is mounted to change its direction from right to left or from left to right, while centering the kingpin, and is also mounted with a geometric angle so as to meet the requisite for the front suspension.

Mounting the front wheel with the geometric angle is called a front wheel alignment. The front wheel alignment is distinguished by several elements, but the optimal operation of the front wheel is achieved by the supplemental operation of the elements with respect to each other. A kingpin inclination among the elements reduces a handling force of a steering wheel with a camber, absorbs an impact generated when the vehicle is running and being braked, and then increases restitution force of a steering wheel, thereby obtaining running safety in the vehicle's straight ahead position and handling safety in the vehicle's turning position.

The kingpin is mounted at an inclination such that its central line lies at a predetermined angle with respect to the vertical line when the vehicle is viewed from the front. An interval between the center line of the kingpin and a center line of the wheel is called offset. The offset is generally characterized as an offset at the wheel center and an offset at the ground. The offset at the wheel center has an effect on the vehicle's straight ahead running characteristics when either the driving force or the engine brake is applied to the wheels. The offset at the ground has an effect on the handling safety when the vehicle is braking or turning. If the offset at the ground is decreased, sensitivity with respect to the steering is decreased, such that the handling safety is increased when the vehicle is cornering and being braked.

Further, stability of the vehicle is closely related to the vibration of the car body. During the vehicle's running, rolling, pitching, and yawing occurs in addition to bounce. These vibrations should be absorbed to increase the stability and ride comfort of the vehicle.

In such vibrations, the rolling occurs at a predetermined point when the vehicle is in a turning situation, and this point is called a roll center. The variation rate of the roll center's height has an effect on the running safety and handling safety of the vehicle. Accordingly, to achieve running safety, it is more desirable to decrease the variation rate of the roll centert's height.

FIG. 6A is a front view of a conventional McPherson type (strut assembly type) suspension. This suspension includes a strut assembly 73 having a shock absorber 72 and being integrally formed with a knuckle 71, a lower arm 75 and a ball joint 76.

This suspension has an advantage in its simple structure and weight. To reduce the kingpin offset a or attain a negative (−) state, the knuckle 71 of the strut assembly 73 must be moved to the engine room, or the ball joint 76 must be moved to an outside of the engine room. However, in the case where the knuckle 71 is moved to the engine room, the available volume of the engine room is to be reduced simultaneously with increasing a kingpin angle thereby having a bad effect on the cornering performance of the vehicle. Also, it is impossible to move the ball joint portion 76 outside of the engine room because of being interfered with by a disk brake. Therefore, this suspension has a problem in reducing the kingpin offset.

FIG. 6B is a front view of conventional Wishbone type (strut assembly type) suspension, wherein the suspension includes upper and lower control arms 81, 82; a steering knuckle 83; a strut assembly 85 having a shock absorber 84 and a spring; and ball joints 86, 87 of the upper and lower control arms 81, 82. A kingpin offset may be reduced by moving a car body-side connecting portion 88 of the upper control arm 81 to the engine room and moving the ball joint 87 of the lower control arm 82 to the outside, even though this suspension has an advantage in its simple structure and weight. To reduce the kingpin offset or attain a negative (−) state, when the car body-side connecting point 88 of the upper control arm 81 is moved to the engine room, the available volume of the engine room is reduced simultaneously with increasing the kingpin offset a. The cornering performance of the vehicle may be adversely affected thereby. And also, it is impossible to move the ball joint 87 of the lower control arm 82 outwardly because of interference with a disk brake. Therefore, this suspension has problems in reducing the kingpin offset.

Further, if the length of the upper control arm is shortened, the kingpin offset may be almost zero, with an increased bushing effect and change in the camber angle. On the contrary, if the length of the upper control arm becomes long, the bushing effect can be decreased but the change in the camber angle and kingpin offset cannot be reduced to zero.

That is, the above conventional suspension systems cannot solve the combined problems of the kingpin offset, steering angle, and bushing effect at the same time.

Accordingly, there is a limit to a free layout degree with respect to providing an angle of a kingpin not to reduce the size of the kingpin offset.

In both the systems the wheels rotate upward and downward depending on the control arms having short lengths, and the height of roll-center is greatly changed thereby adversely affecting driving safety.

Therefore, the present invention has been made in an effort to solve the above-described problems of the conventional front suspension.

SUMMARY OF THE INVENTION

A primary object of the present invention is to improve handling safety by providing a nominal kingpin and decreasing variation of a height of roll-center by means of a nominal link.

Another object of the present invention is to provide a front suspension for a vehicle which can increase a free layout degree by establishing variation of a camber and caster and the kingpin axle, with mutual independence.

To achieve the above objects, the present invention provides front suspension for a vehicle comprising:

- a steering knuckle rotatably supporting a wheel and having a protruded portion on a rear portion and then performing a steering according to a well known tie-rod connected to the knuckle by a ball joint;
- a connecting arm including an upper part being higher than the wheel and curved to the wheel side and a lower part diverging inward and outward, a connecting portion of an outside protruded portion being connected to an upper part of the steering knuckle and a connecting portion of an inside protruded portion being pivotally connected to a lower part of a strut arm;
- an upper control arm formed of two arms disposed forward and rearward and having connecting portions at both ends of the upper control arm, a car body-side connecting portion being pivotally connected to a bracket of the car body and a wheel connecting portion being connected to an upper part of the connecting arm;
- a center control arm formed of two arms disposed forward and rearward and including connecting portions at both ends of the center control arm, a car body-side connecting portion being pivotally connected to a bracket of the car body and a wheel-side connecting portion being pivotally connected to a wing portion protruded forward and rearward between both protruded portions of the connecting arm;
- a lower control arm formed of two arms disposed forward and rearward and including connecting portions at both ends of the lower control arm, a car body-side connecting portion being pivotally connected to a bracket of the car body and a wheel-side connecting portion being pivotally connected to a bottom of the steering knuckle; and
- a strut arm formed of a shock absorber and a spring and having an upper part supported to the car body by an insulator supporting portion and a lower part pivotally connected to the connecting portion of the inside protruded portion under the connecting arm thereby supporting the car body with absorbing impact inputted in the upward and downward direction of the car body to be reduced.

The connecting portion of the inside protruded portion under the connecting arm is disposed to be lower than the connecting portion of the outside protruded portion.

The car body-side connecting portion of a pair of upper control arms is connected to an upper part of the connecting arm by an elastic bush.

The wheel side connecting portion of a pair of center control arms is connected to a swing portion of the connecting arm by a ball joint. The wheel-side connecting portion of a pair of the lower control arms centers at one point and is connected to a lower side of the steering knuckle by a ball joint, and the car body-side connecting portion extends and is connected to the car body by an elastic bush.

In this suspension, an imaginary kingpin axle is formed by a definite straight line connecting a connecting portion of the upper end of the steering knuckle and the connecting arm to an intersecting point of lines which connect the car body connecting portions of the lower arms to the wheel side connecting portions, respectively.

As another aspect of this invention, the suspension includes a lower control arm for connecting the steering knuckle to a vehicle body; an upper control arm; a center control arm; and a connecting arm in which the arms are disposed such that an intersecting point of an imaginary line extending from the lower control arm and an imaginary line connecting an intersecting point of a line extending from the upper control arm and a line extending from the center control arm to an instantaneous center of the wheel with respect to the connecting arm becomes an instantaneous center of the wheel with respect to the car body.

In accordance with this invention, a definite straight line formed by connecting the instantaneous center of the wheel with respect to the car body to a connecting point of the connecting arm and the steering knuckle, becomes a nominal swing arm.

And a roll center is formed at a point where a nominal connecting line connecting the instantaneous center of the wheel with respect to the car body to a ground of the wheel, meets a center line of the car body.

The above and further objects, details and advantages of the present invention will become apparent from the following detailed description of a preferred embodiment thereof, when read in conjunction with the accompanying drawings.

DETAILED DESCRIPTION OF PREFERRED EMBODIMENTS

Figure 1:
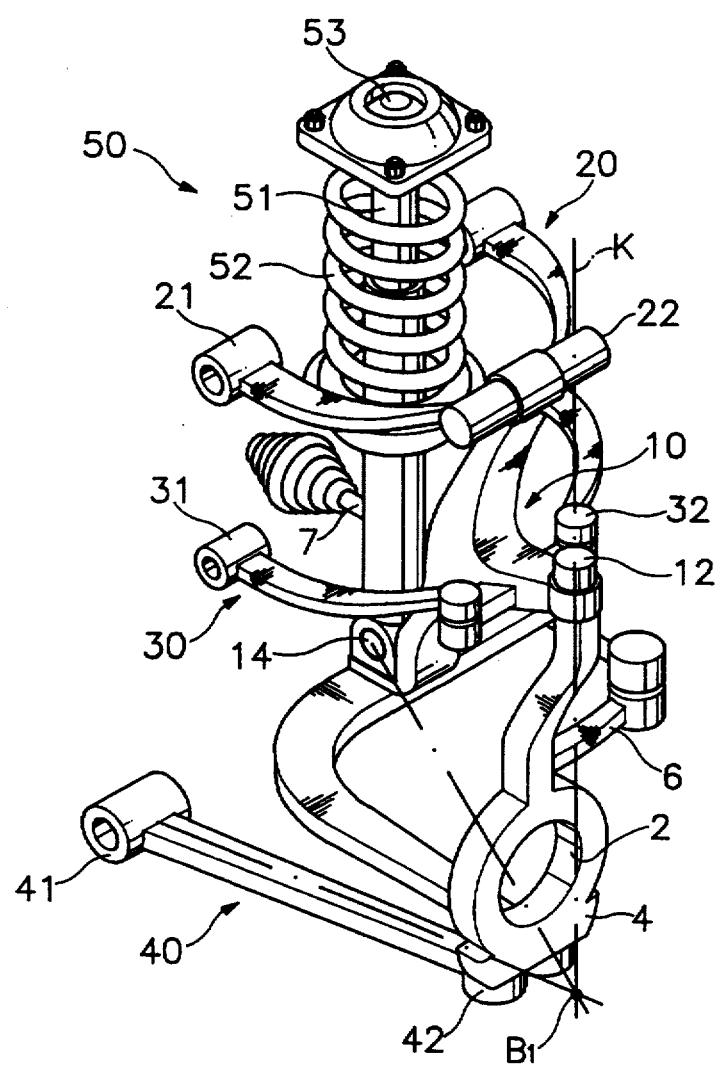
FIG. 1 is a perspective view of a front suspension in accordance with the present invention.
Figure 2:
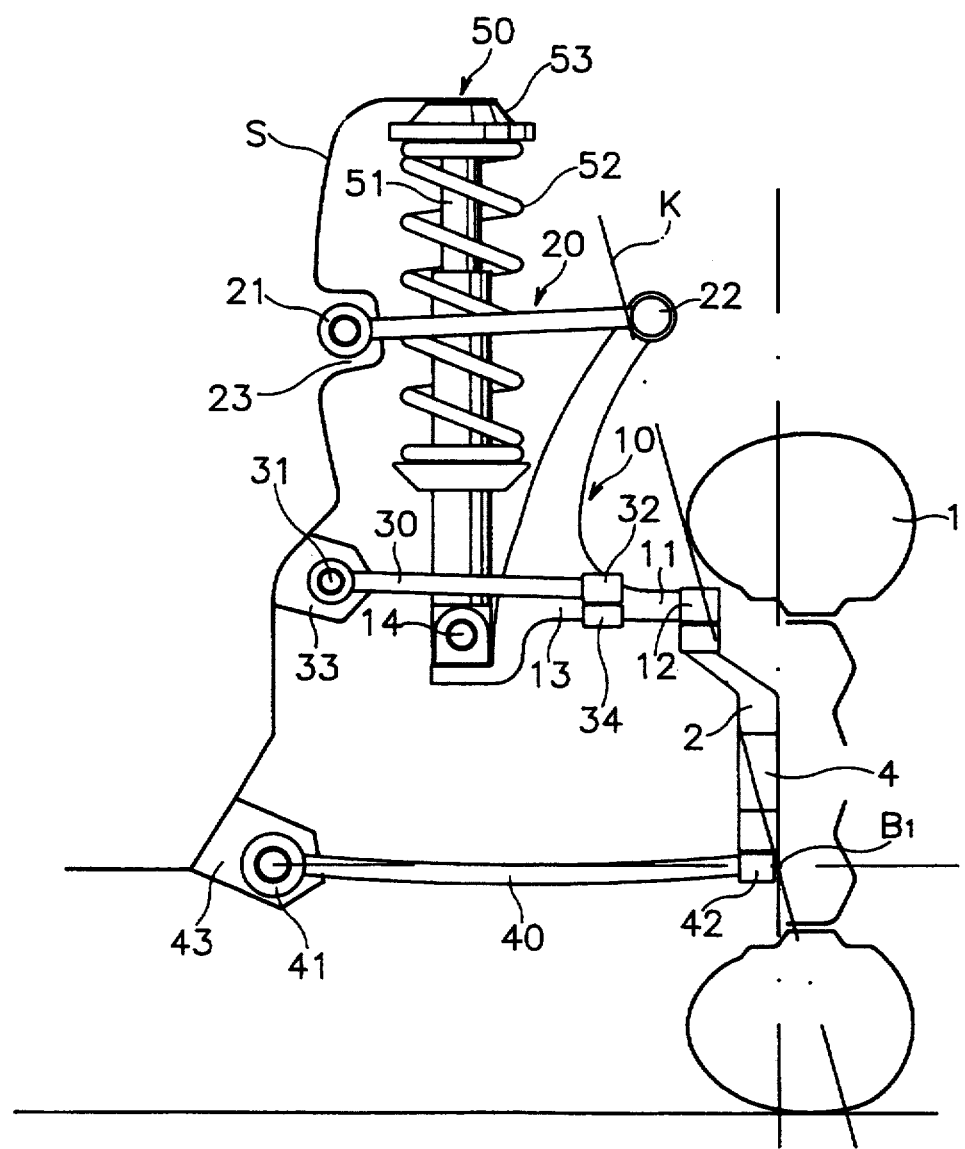
FIG. 2 is a front view of the front suspension in accordance with the present invention.

FIGS. 1 and 2 are respectively a perspective view and a front view of a front suspension in accordance with a first preferred embodiment of the present invention.

The suspension includes a steering knuckle 2 rotatably supporting a wheel 1; a connecting arm 10 connected to the upper side of the steering knuckle 2; upper, center, and lower control arms 20, 30, 40 for connecting upper and lower portions of the connecting arm 10 and a lower part of the steering knuckle 2 to a car body 3 and making the steering knuckle 2 including the wheel move upward and downward with respect to the car body; and a strut assembly 50 having a shock absorber 51 and a spring 52.

The steering knuckle 2 supports the wheel 1 rotatably in the same manner as that of the conventional technique, and a penetrated hole 4 is formed on the center portion of the knuckle 2.

If the wheel 1 is a drive wheel, a driving axle is penetrated, mounting pins (not shown) thereon to drive the wheel 1. A protruded portion 6 is formed on the rear part of the steering knuckle 2, and a well-known tie-rod 7 is connected by a ball joint, and the steering knuckle 2 then steers by the operation of the tie-rod 7.

The connecting arm 10 connected to the upper part of the steering knuckle 2 is formed to be higher than the wheel 1 and curved toward the wheel-side such that an upper part of the connecting arm 10 is disposed on the upper part inside the center line of the wheel 1 to be separated from the upper part of the wheel 1 so as to prevent mutual interference.

The lower part of the connecting arm 10 diverges inward and outward, and a connecting portion 12 of an inside protruded portion 11 is connected with the upper part of the steering knuckle 2 by way of a ball joint. A connecting portion 14 of an inside protruded portion 13 is pivotally connected with a lower part of the strut assembly 50.

The connecting portion 14 of the inside protruded portion 13 is lower than the connecting portion 12 of the inside protruded portion 11. The upper control arm 20 for connecting the upper part of the connecting arm 10 to the car body 3 is formed with two arms disposed forward and rearward. Connecting portions 21, 22 are formed respectively on both ends of the upper control arm 20, and the car body-side connecting portion 21 is pivotally connected to a bracket 23 by an elastic bush. The wheel-side connecting portion 22 is pivotally connected to both ends of the upper part of the connecting arm 10 by an elastic bush.

The center control arm 30 includes two arms formed forward and rearward at its both ends, and connecting portions 31, 32 are formed on both ends of the center control arm 30. The car body-side connecting portion 31 is pivotally connected to a bracket 33 of the car body 3 by an elastic bush, and the wheel side connecting portion 32 is connected by means of ball joint to a wing portion 34 protruded forward and rearward between both protruded portions 11, 13 of the connecting arm 10.

The lower control arm 40 is for connecting the lower part of the steering knuckle 2 to the car body 3 and includes two arms formed forward and rearward. Connecting portions 41, 42 are formed at both ends of the lower control arm 40, and the car body-side connecting portion 41 is pivotally connected to a bracket 43 by an elastic bush. The wheel-side connecting portion 42 centers on one point in the plane and is connected to the bottom of the steering knuckle 2 by a ball joint.

The elastic bushes and ball joints used for connecting the control arms 20, 30, 40 to the car body and the steering knuckle 2 are the same as those used in conventional suspension systems, and allow the wheel 1 including the steering knuckle 2 to move upward and downward with respect to the car body 3.

The elastic bushes used for the connecting portions 21, 22, 31, 41 have proper elasticity and appropriately control the up-and-down movement of the control arms 20, 30, 40. The upper part of the strut assembly 50 is supported to the car body 3 by an insulator supporting portion 53. The lower part of the strut assembly 50 is pivotally connected to the connecting portion 14 of the inside protruded portion 13 under the connecting arm 10, and is supported with respect to the car body 3, and causes impact inputted in the upward and downward direction of the car body 3 to be reduced.

Figure 3:
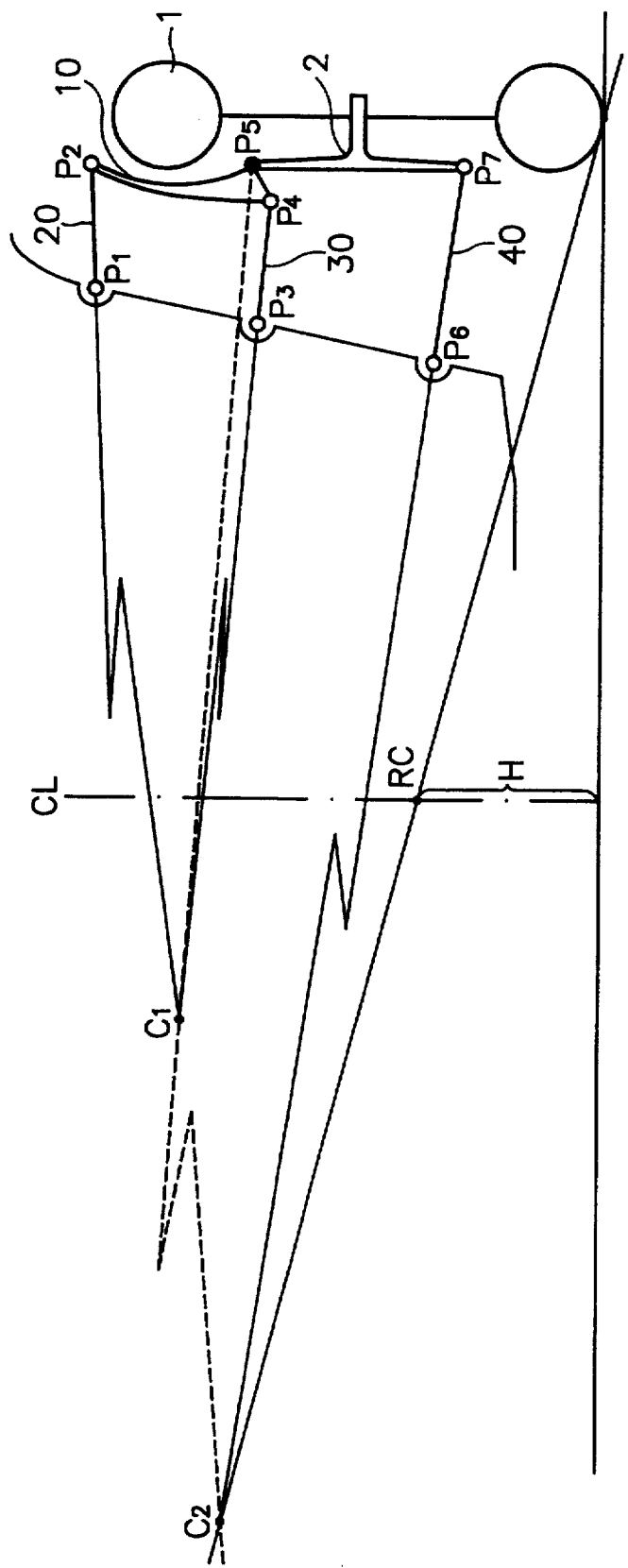
FIGS. 3 and 4 illustrate the effect of the front suspension in accordance with the present invention.
Figure 4:
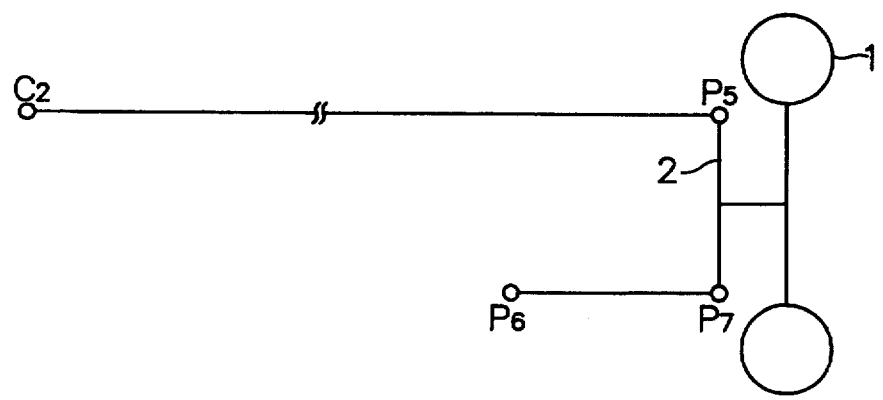

The operational effect of the present invention is now described with reference to FIGS. 3 to 5. Reference numerals of each connecting portion are given with P1, P2, P3, . . . P7 for convenience sake.

When it comes to instantaneous centers of each component forming the suspension during the up-and-down vibration of the wheel 1 and the rolling of the car body, the instantaneous centers of the upper, center, and lower control arms 20, 30, 40 with respect to the car body 3 are respectively connecting points P1, P3, and P6 that respectively connect the control arms 20, 30, 40 to the car body 3. The instantaneous centers of the connecting arm 10 with respect to the upper and center control arms 20, 30 are respectively connecting points P2, P4 connecting the upper and center control arms 20, 30 to the connecting arm 10. The instantaneous centers of the wheel 1 with respect to the center and lower control arms 30, 40 are connecting points P5, P7, respectively.

The instantaneous center of the connecting arm 10 with respect to the car body 3 is an intersecting point C1 where an extending line of P2 and P1 meets an extending line of P4 and P3. The instantaneous center of the wheel 1 with respect to the car body 3 of an intersecting point C2 where an extending line of P5, C1 meets an extending line of P7 and P6.

Accordingly, a definite straight line C2 P5 shown as a broken line in the drawing by connecting the instantaneous center C2 of the wheel 1 with respect to the car body 3 to the connecting point P5 of the connecting arm 10 and the steering knuckle 2 becomes a nominal swing arm, i.e., a nominal upper control arm.

The length of the definite straight line C2 P5, a nominal upper control arm, is so long that a rotation angle of C1 C6 to the up-and-down displacement of the instantaneous center C1 is excessively minute.

Therefore, the change in the height of the instantaneous center C2 is relatively small, which means that the change in the height H of a roll center RC that becomes an intersecting point of the line connecting the instantaneous center C2 to ground of the wheel 1 and a center line CL of the car body, is small. If the change in the height H of the roll center RC is small, the running stability is relatively enhanced.

The height of the car body may be shortened, and it may broaden a driver's outlook and hip point may go down. The center of the car body is thereby lowered when designing a car and inertia moment around a kingpin axle becomes small. Thus, it is advantageous to controlling shimmy phenomenon.

Figure 5:
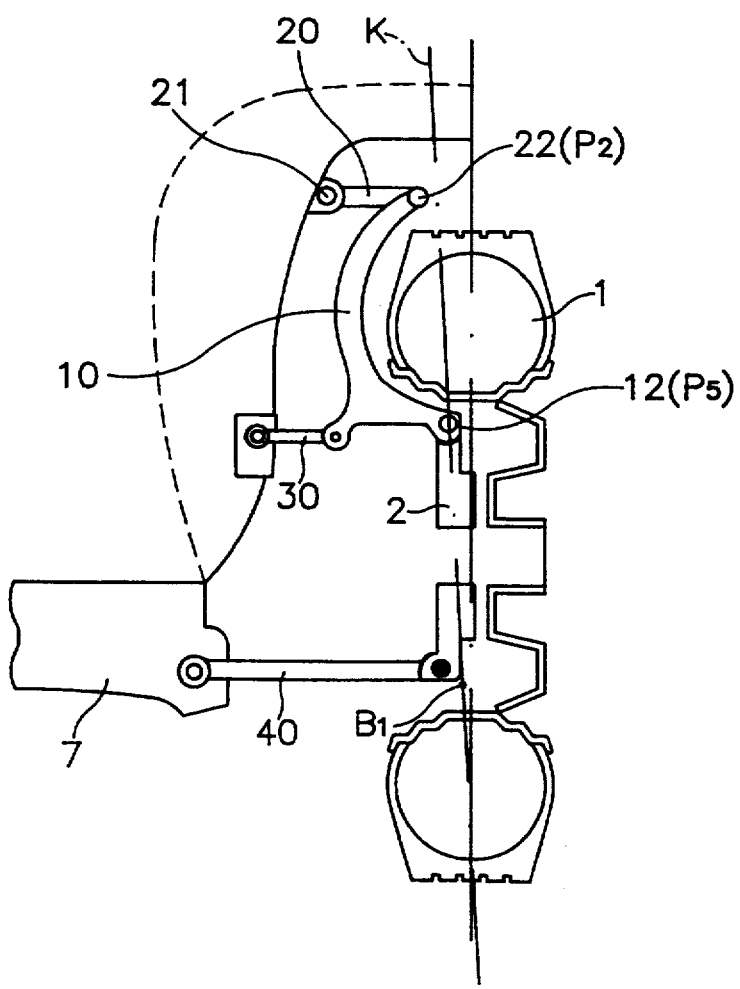
FIG. 5 is a schematic construction view showing an operational effect of the front suspension in accordance with the present invention.
Figure 6A:
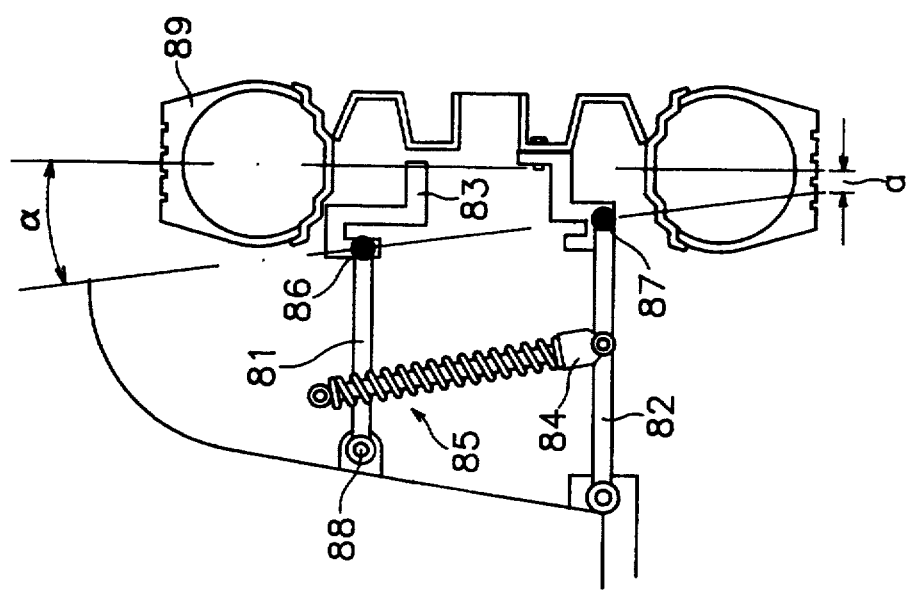
FIGS. 6A and 6B are construction views of a front suspension in accordance with the conventional front suspension.
Figure 6B:
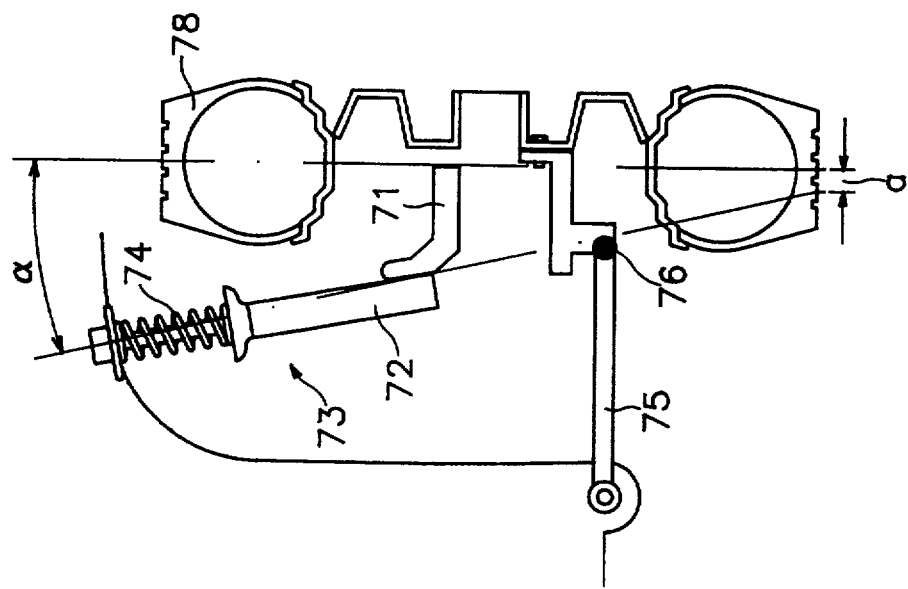

The kingpin axle K in such a suspension is formed of a nominal definite straight line connecting the connecting point P5, the wheel-side connecting portion 12 of the connecting arm 10 with an intersecting point B1 intersected by extending the wheel-side end of the lower control arm 40, as shown in FIG. 5.

The kingpin axle K of the present invention is easily adjustable in accordance with a degree of curvature of the connecting arm 10 and the length of the upper control arm 20. The sensitivity of steering is reduced to enhance the whole driving safety with the straight ahead safety, and the kingpin axle may be independently established without regard to the change of camber and tread.

The kingpin axle is provided not by moving the wheel-side connecting portion 21 of the upper control arm 20 to the engine room, but by moving the wheel-side connecting portion 22 to the wheel side. The effective volume of the engine room attained may be larger than that of a conventional system.

The front wheel suspension for a vehicle in accordance with the present invention can increase a free layout degree by establishing variation of a camber and caster and the kingpin axle, with mutual independence, and improve handling safety by providing a nominal kingpin and decreasing variation of a height of roll-center by means of a nominal link. In addition, it can maximize the effective volume of an engine room since the upper control arms do not have to be moved to the engine room when providing the kingpin axle.

Although preferred embodiments of the present invention have been described in detail hereinabove, it should be clearly understood that many variations and/or modifications of the basic inventive concepts herein taught which may appear to those skilled in the pertinent art will still fall within the spirit and scope of the present invention, as defined in the appended claims.

What is claimed is:

1. A steerable front wheel suspension for a vehicle comprising:
    a steering knuckle rotatably supporting a wheel and having a protruded portion on a rear portion and then performing a steering with a tie-rod connected to said knuckle by a ball joint;
    a strut assembly;
    a connecting arm including an upper part being higher than the wheel and curved to the wheel side and a lower part diverging inward and outward, a connecting portion of an outside protruded portion being connected to an upper part of said steering knuckle and a connecting portion of an inside protruded portion being pivotally connected to a lower part of the strut assembly;
    an upper control arm formed of two arms disposed forward and rearward and having connecting portions at both ends of said upper control arm, a car body-side connecting portion being pivotally connected to a bracket of the car body and a wheel connecting portion being connected to an upper part of the connecting arm;
    a center control arm formed of two arms disposed forward and rearward and including connecting portions at both ends of said center control arm, a car body-side connecting portion being pivotally connected to a bracket of the car body and a wheel-side connecting portion being pivotally connected to a wing portion protruded forward and rearward between both protruded portions of said connecting arm; and
    a lower control arm formed of two arms disposed forward and rearward and including connecting portions at both ends of said lower control arm, a car body-side connecting portion being pivotally connected to a bracket of the car body and a wheel-side connecting portion being pivotally connected to a bottom of said steering knuckle; and
    said strut assembly being formed of a shock absorber and a spring and having an upper part supported to the car body by an insulator supporting portion and a lower part pivotally connected to the connecting portion of the inside protruded portion under the connecting arm thereby supporting the car body with absorbing impact inputted in the upward and downward direction of the car body to be reduced.

2. A steerable front wheel suspension as claimed in claim 1, wherein said connecting portion of the inside protruded portion under the connecting arm is disposed to be lower than the connecting portion of the outside protruded portion.

3. A steerable front wheel suspension as claimed in claim 1, wherein said car body-side connecting portion of a pair of upper control arms is connected to an upper part of the connecting arm by an elastic bush.

4. A steerable front wheel suspension as claimed in claim 1, wherein said wheel-side connecting portion of a pair of center control arms is connected to a swing portion of the connecting arm by a ball joint.

5. A steerable front wheel suspension as claimed in claim 1, wherein said wheel-side connecting portion of a pair of the lower control arms centers at one point and is connected to a lower side of the steering knuckle by a ball joint, and the car body-side connecting portion extends and is connected to the car body by an elastic bush.

6. A steerable front wheel suspension as claimed in claim 1, wherein an imaginary kingpin is formed by a definite straight line connecting a connecting portion of the upper end of the steering knuckle and the connecting arm to an intersecting point of lines which connect the car body connecting portions of the lower arms to the wheel-side connecting portions, respectively.

* * * * *